United States Patent [19]
Kubota et al.
[11] 4,456,531
[45] Jun. 26, 1984

[54] FILTER AND A MANUFACTURING METHOD THEREFOR

[75] Inventors: Misao Kubota, Nagano; Kazuhiko Terao, Komoro; Kenji Shimada, Ueda, all of Japan

[73] Assignee: Totoku Electric Co., Ltd., Tokyo, Japan

[21] Appl. No.: 328,840

[22] Filed: Dec. 9, 1981

Related U.S. Application Data

[62] Division of Ser. No. 177,135, Aug. 11, 1980, abandoned.

[51] Int. Cl.³ .......... B01D 25/20
[52] U.S. Cl. .......... 210/409; 210/497.1; 210/499
[58] Field of Search .......... 210/497.1, 499, 409

[56] References Cited

U.S. PATENT DOCUMENTS 2,711,253 6/1955 Mills .......... 210/497.1 X
3,105,289 10/1963 Jordin .......... 210/497.1 X
3,132,099 5/1964 Eilhauer .......... 210/499 X
3,200,952 8/1965 Jordin .......... 210/497.1 X
3,268,999 8/1966 Adler .......... 210/499 X
3,388,448 6/1968 Lovett .......... 210/499 X
3,747,770 7/1975 Zentis .......... 210/499 X

*Primary Examiner*—Thomas G. Wyse
*Attorney, Agent, or Firm*—Oblon, Fisher, Spivak, McClelland & Maier

[57] ABSTRACT

A filter is disclosed which is capable of withstanding repeated use by cleaning. The filter is so constructed that around a frame body is wound a filter wire at a constant slit space of less than 40 with a maximum error of 50%. A method for manufacturing such a filter is also disclosed which comprises winding, on a frame body, a filter wire paired with a spacer wire for keeping the slit space of said filter wire constant in such a manner that each turn is in contact with adjacent turns; and removing the spacer wire alone by chemical or physical means while holding these wires fixed so as to obtain a filter with a smaller slit space error.

17 Claims, 11 Drawing Figures d
6
1
7

FILTER AND A MANUFACTURING METHOD THEREFOR

This is a division of application Ser. No. 177,135, filed Aug. 11, 1980, now abandoned.

BACKGROUND OF THE INVENTION

The present invention relates to a filter used in a filtering device for removing particles floating in liquids or in the air and to a method for manufacturing the same.

For filters for removing particles floating in liquids or in the air, sand, gravel, or metal nets or fibrous materials of paper, cloth, resin, glass or metals have been conventionally used. However, these were incapable of withstanding use over extended periods of time due to the fact that they tended to clog and lacked durability. A filter which is capable of operation over an extended period of time by reverse cleaning and which is rugged and durable has been proposed as shown in FIG. 1. This filter is obtained by helically winding a profile metal wire A for a filter at a constant spacing d, axially disposing metal bars B for securing space inside the cylinder formed by the metal wire A, and welding the profile metal wire A for a filter and the metal bars B for securing space at their cross points. However, due to the limits imposed by the techniques involved in the manufacturing method, this filter is defective in that it is impossible to obtain uniform fine slits of less than 40μ with precision and economy. The obtainable slit space is 50–100μ at best and the slit space is not uniform.

Another kind of filter has also been used which is obtained by winding a filter wire at constant spacing on a core body of a polygonal metal pipe. However, a winding machine capable of providing a uniform slit space of less than 40μ is not available. With the best winding machine, it is only possible to obtain a filter having variation of about ±50μ.

As another method, a filter wire with resin coating is wound around a core body of a polygonal metal pipe so that each turn is in contact with adjacent turns. The resin coating is dissolved by a suitable solvent for obtaining a slit space. However, with this method, it is difficult to coat the resin uniformly on the wire with a thickness of several microns to 20μ. Thickness variations of 8–10μ are generated even with the best coating method obtainable. Thus, this method has also proven unsuitable for obtaining uniform slit spaces due to irregular thickness of the coated resin. Furthermore, when the resin coating is dissolved in a suitable solvent, the core body and the filter wire are loosened and the slit space is disturbed. Thus, this method is also defective in that a uniform space within the range of less than 40μ is hard to obtain with precision.

SUMMARY OF THE INVENTION

The present invention has been made to overcome these problems of the prior art and has for its object to provide a filter which provides, uniformly and with precision, a slit space of less than 40μ, which easily filters floating particles of less than 40μ in particle size which are hard to settle in a sewage disposal treatment, which is rugged, in which the removal of the clogging substances is easy by reverse cleaning, which performs the filtering with extremely good efficiency, which has a long service life and is suitable for mass-production, and which is inexpensive to manufacture.

It is another object of the present invention to provide a filter which facilitates the removal of floating materials less than 40μ in particle size with a compact and inexpensive filtering device without requiring a large installation such as a settling reservoir, thereby economizing the sewage disposal treatment.

The present invention, in one aspect, provides a filter comprising a frame body and a filter wire securely held on said frame body with a constant slit space between each turn of less than 40μ with a maximum error of less than 50%.

The present invention, in another aspect, provides a method for manufacturing a filter characterized by comprising the steps of winding, on a frame body, a filter wire paired with a wire of a material physically or chemically different from the materials of said filter wire and said frame body so that each turn is in contact with adjacent turns, said wire being a spacer wire for keeping the slit space of said filter wire constant; fixing the wire ends; and removing said spacer wire alone, utilizing its different physical or chemical properties while keeping said space between each turn of said filter wire constant.

DETAILED DESCRIPTION OF THE PREFERRED EMBODIMENTS

The present invention will now be described in more detail with reference to the accompanying drawings.

Figure 1:
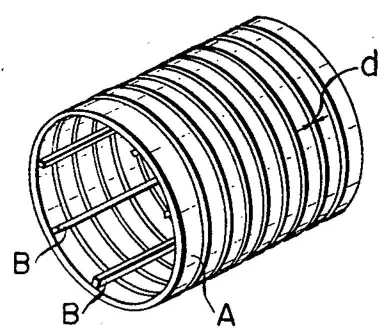
FIG. 1 is a perspective view of a conventional filter.
Figure 2:
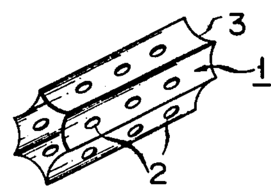
FIGS. 2, 3 and 4 are perspective views illustrating examples of a frame body constituting a filter of the present invention.
Figure 3:
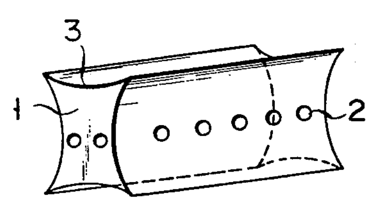
Figure 4:
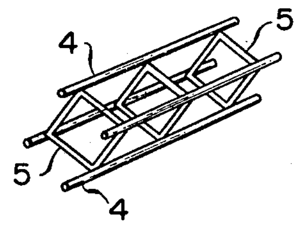
Figure 5:
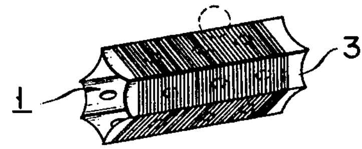
FIG. 5 is a perspective view illustrating the state in which a filter wire and a spacer wire are wound around the outer circumference of a frame body in such a manner that each turn is in contact with adjacent turns.
Figure 6:
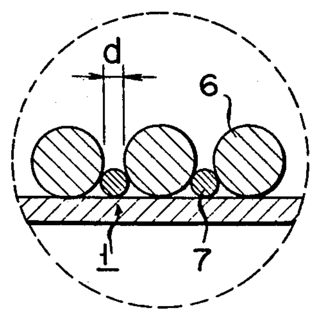
FIG. 6 is a partially enlarged sectional view of FIG. 5.
Figure 7:
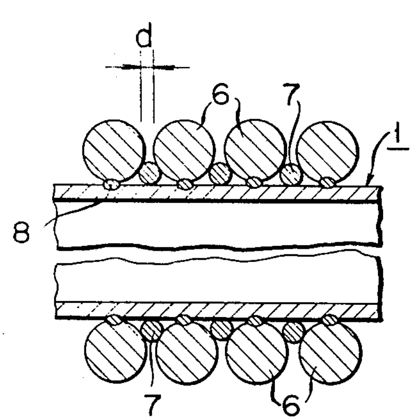
FIGS. 7 and 8 are sectional views illustrating the lded state of the filter wire.
Figure 8:
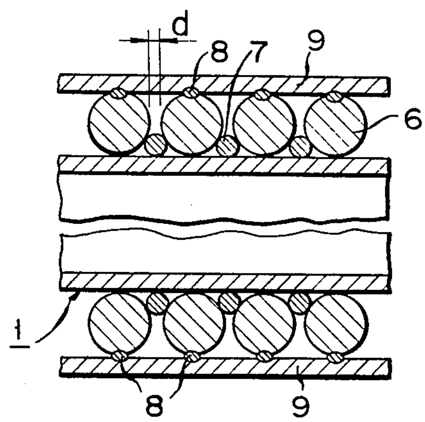
Figure 9:
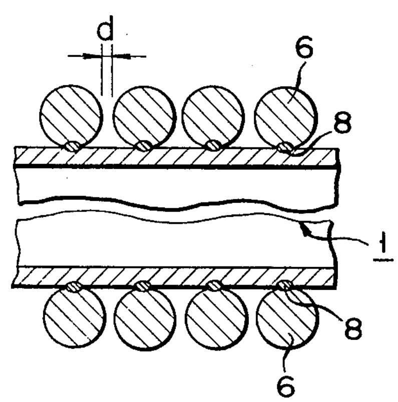
FIGS. 9 and 10 are sectional views illustrating the removal of the spacer wire from the filter shown in FIGS. 7 and 8.
Figure 10:
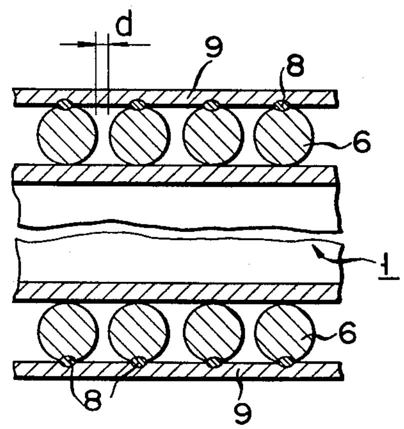

FIGS. 2–4 are perspective views illustrating a frame body of the present invention: FIGS. 2 and 3 show a case in which a plate body 1 with a number of through holes 2 is formed in a polygonal shape, and each side 3 of the polygon is curved toward the core axis. In the frame body shown in FIG. 4, several securing bars 4 are disposed in equidistant relationship to one another, several frame elements 5 are disposed inside of these, and these securing bars 4 and these frame elements 5 are connected for forming the frame body. A filter wire 6 and a spacer wire 7 are wound as a pair around the outer circumference of the frame body so that each turn is in contact with adjacent turns. FIG. 5 is a perspective view illustrating the state where the filter wire 6 and the spacer wire 7 are wound around the frame body shown in FIG. 2. FIG. 6 is a partially enlarged sectional view of FIG. 5 wherein the filter wire 6 and the spacer wire 7 are wound so that each turn is in contact with adjacent turns and the slit space is kept constant by fixing the wire ends. Although the slit space can be kept sufficiently constant by contact friction between the frame body and the filter wire 6, it is also possible to weld or reinforce them for fixing by a resin or an adhesive if needed. FIG. 7 shows an example where adhered portions 8 are formed between the frame body and the filter wire 6. FIG. 8 shows another example where, after alternately winding the filtering wire 6 and the spacer wire 7, a space-holding wire 9 is wound therearound in the transverse direction of these wires, and adhered portions 8 are formed at each section of the wires 6 and 9. While keeping the slit space of the filter wire 6 constant, the spacer wire 7 alone is removed by chemical or physical means. The filter shown in FIG. 9 is obtained from the element shown in FIG. 7, and the filter shown in FIG. 10 is obtained from the element shown in FIG. 8. These filters have a constant slit space "d" with small deviation.

The material of the spacer wire 7 must be suitably selected from chemically different materials (for example, the spacer 7 alone is soluble or corrosive in a certain solvent, acid, or alkali) or from physically different materials (for example, the spacer wire alone melts or sublimates at a certain temperature) from the materials constituting the plate body 1, the securing bars 4, the frame elements 5, and if required, the adhered parts 8. The combination or the selections of these materials seems to be obvious to those skilled in the art. That is, the frame body, the adhered parts 8, the filter wire 6 and the spacer wire 7 may be made of combinations selected from various materials such as metals, ceramics, synthetic resins (thermosetting resins or thermoplastic resins) and so on. Further, welding between the core body and the filter wire 6 is not necessary, as described above. Welding, if it is performed, need not be performed before dissolving the spacer wire 7, but may be performed thereafter.

Figure 11:
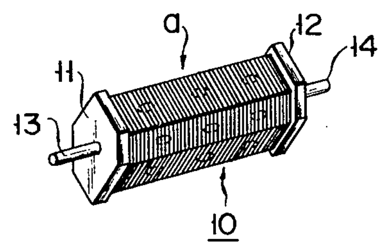
FIG. 11 is a perspective view of an example to which the method of present invention is applied.

FIG. 11 shows an application of the filter shown in FIG. 5. Caps 11 and 12 are sealed to both ends of filter element 10. A cleaned material outlet port 13 is disposed in cap 11, and a compressed air inlet port 14 for reverse cleaning is disposed in the cap 12. Sewage passes the filter wire 6 in the direction shown by the arrow a and is filtered. It then reaches the space surrounded by the curved plate body 1 and the planes defined by the many turns of the filter wire 6 and passes through the through holes 2 to the inside of the frame body. It is then exhausted from the port 13 as cleaned sewage.

Thus, in accordance with the present invention, a material which is chemically or physically different from the frame body and the filter wire is wound as a spacer wire with the filter wire around the frame body so that each turn is in contact with adjacent turns. Thus, the spacer wire alone may be removed utilizing the chemical or physical difference. Thus, a slit space of less than about 40μ in width and having a maximum error (maximum or minimum slit space/mean slit space) of 50% is readily obtainable by changing the diameter of the spacer wire. Removal of floating substances less than 40μ in particle size in the sewage disposal treatment has heretofore presented various problems. With the method utilizing the settling reservoir, for example, the settling speed of particles less than 40μ in diameter is very slow, and large pieces of equipment and long processing times are required. With the sand filtering method, the active carbon filtering method, and the sponge-like resin filtering method, clogging tends to be caused, resulting in expensive maintenance. However, with the present invention, these problems are eliminated so that the treatment time can be shortened extremely, stable operation over an extended period of time is enabled, and the cost for sewage treatment can be significantly decreased. Further, since the frame body 1 is of deformed pipe, space is formed between the curved face 3 of the frame body and the filter wire 4 so that the flow of air in the reverse cleaning is facilitated. Thus, compressed air can be uniformly distributed throughout the filter so that clogging is prevented.

EXAMPLE 1

Around the outer circumference of a hexagonal profile stainless steel pipe 1 with a 12 mm diagonal and a thickness of 6 mm were wound a stainless steel wire of 160 in Vickers hardness and 0.6 mm in diameter as the filter wire 6 and a phosphor bronze wire of 157 in Vickers hardness and 0.165 mm in thickness as the spacer wire 7 in such a manner that each turn was in contact with adjacent turns. After securing the wire ends, the whole element was submerged in a nitric acid solution so as to dissolve the phosphor bronze wire. After rinsing with water and drying, a stainless steel wire 0.6 mm in diameter was disposed as a space-holding wire 9 in such a manner as to cross the filter wire 6 at right angles. It was welded under the conditions of 50 msec conduction time, 1,000 A current and 20 kg pressure exerted, and the filter wire 6 was secured to provide a filter.

The slit space d of the filter wire 6 was measured at 100 places. The mean value of the measured values was $\bar{d}=30\mu$; the standard deviation, $\sigma=5.5\mu$; the maximum slit space, $d_{max}=41\mu$; and the minimum slit space, $d_{min}=15\mu$.

EXAMPLE 2

Around the outer circumference of a hexagonal profile stainless steel pipe 1 with a 12 mm diagonal and a thickness of 0.6 mm were wound a stainless steel wire of 160 in Vickers hardness and 0.6 mm in diameter as the filter wire 6 and a phosphor bronze wire of 157 in Vickers hardness and 0.171 mm in diameter as the spacer wire 7 in such a manner that each turn was in contact with adjacent turns. After securing the wire ends, a stainless steel wire 0.6 mm in diameter as a space-holding wire 9 was arranged perpendicularly to the filter wire 6 and welded to be secured under the same conditions as in Example 1. The element was then submerged in a nitric acid solution so as to dissolve the phosphor bronze. The filter was obtained after rinsing with water and drying.

The slit space d of the filter wire 6 was measured at 100 places. The mean value of the measured values was $\bar{d}=42\mu$; the standard deviation, $\sigma=2.8\mu$; the maximum slit space, $d_{max}=49\mu$; and the minimum slit space, $d_{min}=37\mu$. A filter of uniform slit space was thus obtained. This is attributable to the fact that the phosphor bronze wire prevented expansion and movement of the filter wire 6 which may be caused by heat generated during welding.

EXAMPLE 3

Around the outer circumference of a hexagonal profile stainless steel pipe 1 with a 12 mm diagonal and a thickness of 0.6 mm were wound a stainless steel wire of 160 in Vickers hardness and 0.6 mm in diameter as the filter wire 6 and a phosphor bronze wire of 157 in Vickers hardness and 0.165 mm in diameter as the spacer wire 7 in such a manner that each turn was in contact with adjacent turns. After securing the wire ends, a stainless steel wire 0.6 mm in diameter as a space-holding wire 9 was arranged perpendicularly to the filter wire 6 and welded to be secured under the same conditions as in Example 1. The element was then submerged in a nitric acid solution so as to dissolve the phosphor bronze. The filter was obtained after rinsing with water and drying.

The slit space d of the filter wire 6 was measured at 100 places. The mean value of the measured values was $\bar{d}=29\mu$; the standard deviation, $\sigma=0.9\mu$; the maximum slit space, $d_{max}=32\mu$; and the minimum slit space, $d_{min}=27\mu$. A filter of uniform slit space was thus obtained. This is attributable to the fact that the phosphor bronze wire prevented expansion and movement of the filter wire 6 which may be caused by heat generated during welding.

EXAMPLE 4

Around the outer circumference of a hexagonal profile stainless steel pipe 1 with a 12 mm diagonal and a thickness of 0.6 mm were wound a stainless steel wire of 160 in Vickers hardness and 0.6 mm in diameter as the filter wire 6 and a phosphor bronze wire of 157 in Vickers hardness and 0.158 mm in diameter as the spacer wire 7 in such a manner that each turn was in contact with adjacent turns. After securing the wire ends, a stainless steel wire 0.6 mm in diameter was disposed as the space-holding wire 9 perpendicularly to the filter wire 6 and welded to be secured under the same conditions as in Example 1. The element was then submerged in a nitric acid solution so as to dissolve the phosphor bronze. After rinsing with water and drying, the filter was obtained.

The slit space d of the filter wire 6 was measured at 100 places. The mean value of the measured values was $\bar{d}=16\mu$; the standard deviation, $\sigma=0.8\mu$; the maximum slit space, $d_{max}=19\mu$; and the minimum slit space $d_{min}=14\mu$. A filter of uniform slit space was thus obtained as in Example 2.

EXAMPLE 5

Around the circumference of a hexagonal profile stainless steel pipe 1 with a 12 mm diagonal and a thickness of 0.6 mm were wound a stainless steel wire of 160 in Vickers hardness and 0.6 mm in diameter as the filter wire 6 and a phosphor bronze wire of 157 in Vickers hardness and 0.154 mm in diameter as the spacer wire 7 in such a manner that each turn was in contact with adjacent turns. After securing the wire ends, a stainless steel wire 0.6 mm in diameter was disposed as the space-holding wire 9 perpendicularly to the filter wire 6 and welded to be secured under the same conditions as in Example 1. The element was then submerged in a nitric acid solution so as to dissolve the phosphor brone wire. After rinsing with water and drying, the filter was obtained.

The slit space d of the filter wire 6 was measured at 100 places. The mean value of these measured values was $\bar{d}=8.1\mu$; the standard deviation, $\sigma=0.5\mu$; the maximum slit space, $d_{max}=9.7\mu$; and the minimum slit space, $d_{min}=6.8\mu$. A filter with a uniform slit space was thus obtained as in Examples 2 and 3.

EXAMPLE 6

Around the outer circumference of a hexagonal profile stainless steel pipe 1 with a 12 mm diagonal and a thickness of 0.6 mm were wound a stainless steel wire of 160 in Vickers hardness and 0.6 mm in diameter as the filter wire 6 and a polyamide resin wire 0.17 mm in diameter as the spacer wire 7 in such a manner that each turn was in contact with adjacent turns. After securing the wire ends, a stainless steel wire 0.6 mm in diameter as a space-holding wire 9 was arranged perpendicularly to the filter wire 6 and welded to be secured under the same conditions as in Example 2. The element was introduced in an oxidizing atmosphere of 500° C. for 2 hours so as to decompose and carbonize the resin. The element was further treated for removing the carbonized resin residue by giving vibration to it after being air-cooled. The filter was finally obtained after rinsing with water and drying.

The slit space d of the filter wire 6 was measured at 100 places. The mean value of the measured values was $\bar{d}=37\mu$; the standard deviation, $\sigma=3.1\mu$; the maximum slit space, $d_{max}=42\mu$; and the minimum slit space, $d_{min}=29\mu$. A filter of uniform slit space was thus obtained.

EXAMPLE 7

Around the outer circumference of a tetragonal profile stainless steel pipe 1 with a 15 mm diagonal and a thickness of 2.0 mm were wound a polyamide resin wire 0.6 mm in diameter as the filter wire 6 and a polytetrafluoroethylene wire 0.17 mm in diameter as the spacer wire 7 in such a manner that each turn was in contact with adjacent turns. After securing the wire ends by means a bonding agent the whole element was submerged in a formic acid solution so as to dissolve the polyamide resin. The filter was obtained after rinsing with water and drying.

The slit space d of the filter wire 6 was measured at 100 places. The mean value of the measured values was $\bar{d}=38\mu$; the standard deviation, $\sigma=5.4\mu$; the maximum slit space, $d_{max}=49\mu$; and the minimum slit space, $d_{min}=25\mu$. A filter of uniform slit space was thus obtained.

What we claim is:

1. A filter obtained by a method which comprises the steps of:

(a) helically winding a filter wire and a spacer wire on a frame body such that the two wires are in contact with each other all along their lengths and such that each turn of the two wires is in contact with the adjacent turns on either side all along the length of the filter, the spacer wire being formed of a material which is different than the material of which the filter wire is formed and the longitudinal slit distance between adjacent turns of the filter wire being made constant by the dimensions of the spacer wire interposed between adjacent turns of the filter wire, then (b) removing the spacer wire without disturbing the spacing between adjacent turns of the filter wire by use of the different properties of the two wires.

2. A filter wire as recited in claim 1 wherein the frame body is made of metal or a plastic material.

3. A filter as recited in claim 1 wherein the filter wire is made of a metal or plastic material.

4. A filter as recited in claim 1 wherein the frame body comprises a polygonal prism each side of which is concave.

5. A filter as recited in claim 4 wherein the frame body comprises a rectangular prism.

6. A filter as recited in claim 4 wherein the frame body comprises a hexagonal prism.

7. A filter as recited in claim 1 wherein at least one end of the filter is closed with a lid body having a cleaned substance outlet port therein.

8. A filter as recited in claim 1 wherein one end of the filter is closed with a lid body having a cleaned substance outlet port therein and the other end of the filter is closed with another lid body having a compressed air inlet port therein for reverse cleaning.

9. A filter obtained by the method recited in claim 1 wherein said method comprises the further step of fixing the filter wire to the frame body before removing the spacer wire.

10. A filter as recited in claim 1 wherein the filter wire is larger in diameter than the spacer wire.

11. A filter obtained by the method recited in claim 10 and comprising the further step of fixing a space-holding wire to the filter wire before removing the spacer wire.

12. A filter as recited in claim 11 wherein the space-holding wire is wound helically around, transversely to, and radially outwardly of the filter wire.

13. A filter as recited in claim 1 wherein:

(a) the spacer wire is physically different from the filter wire and (b) the spacer wire is removed by use of a different physical property thereof.

14. A filter as recited in claim 1 wherein:

(a) the spacer wire is chemically different from the filter wire and (b) the spacer wire is removed by use of a different chemical property thereof.

15. A filter as recited in claim 1 wherein the filter wire makes substantially point contacts with the frame body.

16. A filter as recited in claim 1 wherein the longitudinal slit distance between adjacent turns of the filter wire is less than 40 microns and is constant with a maximum error of 50%.

17. A filter as recited in claim 1 wherein the filter wire and spacer wire are wound on the frame body simultaneously.

* * * * *